Feb. 14, 1967 A. J. ROSENBERG 3,304,371
INFORMATION PROCESSING SYSTEM
Filed Sept. 25, 1963
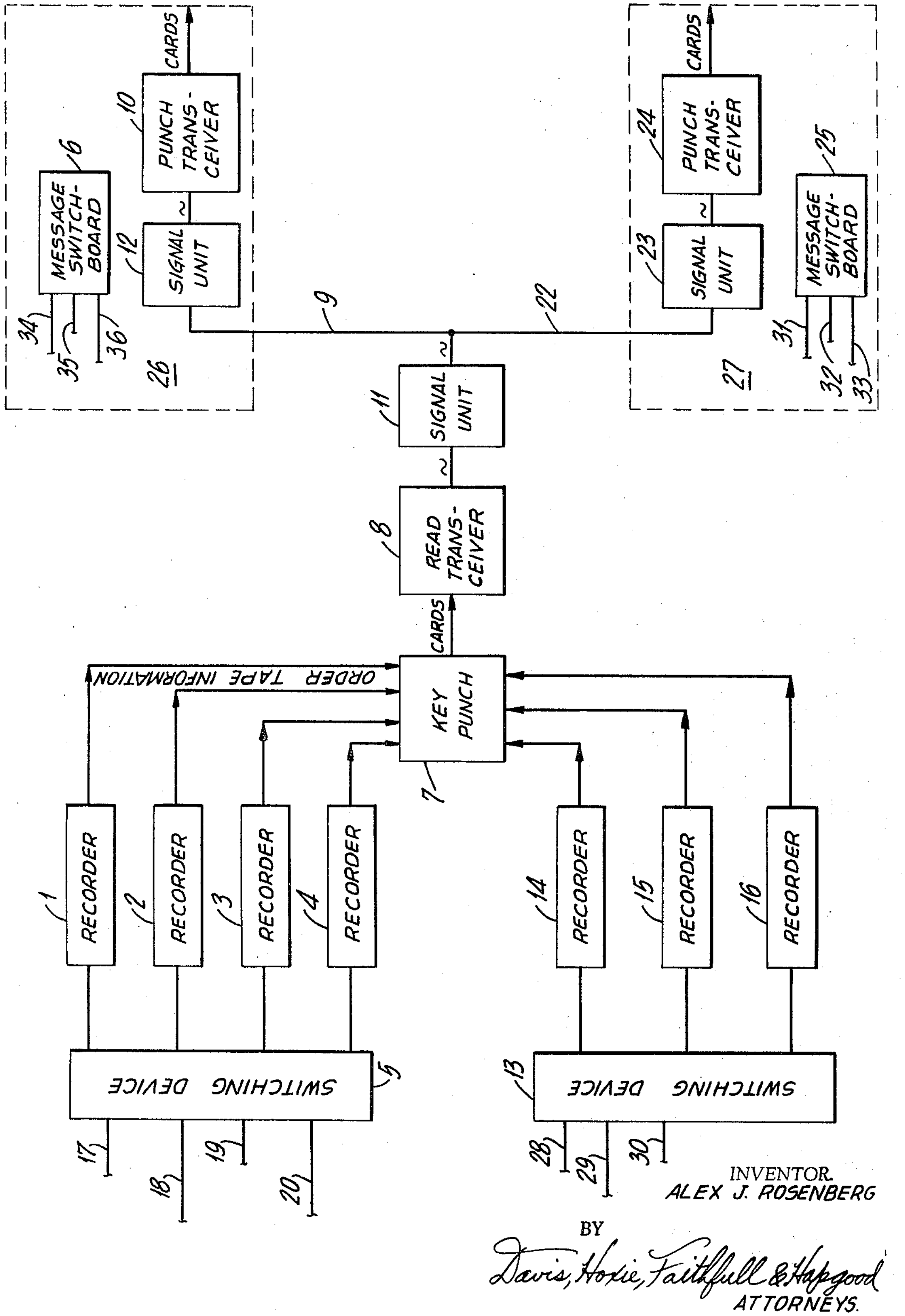
INVENTOR.
ALEX J. ROSENBERG
BY
Davis, Hoxie, Faithfull & Hapgood
ATTORNEYS.

United States Patent Office 3,304,371

Patented Feb. 14, 1967

3,304,371
INFORMATION PROCESSING SYSTEM

Alex J. Rosenberg, 277 West End Ave., New York, N.Y. 10023

Filed Sept. 25, 1963, Ser. No. 311,479
2 Claims. (Cl. 179—1)

This invention relates to an information processing system and more particularly to methods of obtaining information from a large number of incoming telephone calls, converting the information onto punched cards and relaying it to a computer.

Various businesses, groups of individuals, operating approximately on the same schedule and during the same working hours, deliver information over a telephone system with a short period of high activity and long periods of relatively low activity. For example, salesmen often call their central office to place orders late in the day. This uneven activity necessitates the maintenance of large facilities to adequately handle the peak amount of activity. The facility and its personnel remain relatively idle for the long period of relative non-activity.

Another communication problem with such salesmen is that they tie up the telephone lines because during their period of contact with the central office they receive instructions, messages, or engage in "small talk". Thus, to adequately handle such activity late in the day and compensate for the time during which the particular line is tied up, the central office telephone facilities must be large and over-staffed in relation to the need during the rest of the day. During the rush periods mistakes in order-taking are likely to occur. The cost of receiving and processing orders is of considerable importance to many firms.

It is an objective of the present invention to eliminate the necessity for the maintenance of such large facilities and their operating personnel at the information reception and processing centers and to process orders more accurately.

It is another objective of this invention to separate the information receiving system from the information processing system and thereby distribute the processing activity over a longer period of time and over various groups which have different cycles of activity.

It is another objective of this invention to shorten the duration of calls to the receiving center and thus curtail the use of these facilities by each caller to a short efficient interval.

A feature of this invention is the utilization of a system of recorders interconnected to a switching device having a single telephone number and a plurality of incoming lines in such a manner that a caller is assured of obtaining a recorder. In this way, one telephone number can serve several parties at any one time.

A further feature of this invention is the incorporation within the recording device of coded information or numbers which are given to the caller. These numbers inform the caller to call or perform a further step of communication with the home office, for example to call a separate number which will give them messages and instructions.

A further feature is the utilization of numbers by the caller for the particular in formation to be transmitted to the recorders. These numbers are in effect a program for a computer maintained at the central office for billing, inventory and other steps in order processing.

The above-mentioned and other features and objects of this invention will become more apparent by reference to the following description taken in conjunction with the accompanying drawing, in which:

FIGURE 1 shows the schematic drawing of the entire system.

With reference to the figure, the invention utilizes a system of recorders 1, 2, 3 and 4 which are connected to switching device 5. The switching device 5 has four telephone lines 17, 18, 19 and 20 connected to it, all of which have the same telephone number. The salesmen call this number and is automatically connected to an unused recorder by the switching device 5. Although four recorders are shown, more or less may be used depending upon the number of incoming calls to be handled during the peak period. Each of the recorders 1–4 has a magnetic announcement tape which automatically makes a statement or announcement as soon as an incoming telephone call is connected to it for about 10 to 20 seconds. The announcement tape has recorded thereon a series of numbers with each number representing a man whom it is desired to have contact another number. Each recorder has the same announcement on its announcement tape as the other recorders. As soon as the caller is connected to a recorder, these numbers are announced to the caller. When a particular salesman's number is called, either a further number informs him what he is to do or he knows what to do. For example, a salesman who hears his number would call message switchboard 6 for instructions. In this manner, by the use of a code number representing his name, he is informed to call another number for a message or instructions and his contact with the receiving station is held to a minimum. The announcement tape is changed periodically, for example every hour. The message switchboard 6 makes a list of those salesmen who have called during the period and their numbers are removed from the next announcement tape. The numbers of salesmen who have called are omitted from the replacement announcement tape and new numbers are added representing salesmen who should call the message switchboard in the next hour.

A suitable recorder having an announcement tape is "Electronic Secretary", manufactured by Electronic Secretary Industries, Inc., of Waukesha, Wisconsin, for Western Electric, and available through the Bell Telephone companies.

After hearing the recorded announcement, the salesman proceeds to dictate his order to an order tape in the recorders 1–4. The orders are given in a predetermined programming code. The "Electronic Secretary" machine has a foot control which regulates the playing back of the tape. The coded message which he dictates into the recorder is in a form which will ultimately program a computer (at the central office) utilized for stock control and inventory. For example, if the order were for 5 kegs of nails for customer Jones to be shipped on the 15th of the month at $15 a keg, the salesman would convert the customer's name and address, the quantity, price, material and shipping date into the appropriate digits established for the party, item, cost, etc., such as: This is salesman 24, sale to customer 018, 5 of 6439 at 286, ship on 15th.

At the predetermined time, for example once every hour, the order tape is removed from the recorder to a separate "play-back" machine. The same recorder may be used to play-back the recorded tape by taking the recorder off the telephone circuit and replacing it by another recorder. In either case, the order tape is then broadcast through earphones to a key punch operator who operates key punch 7 and transcribes the information of the various orders into punched cards. The key punch operator makes a list of the salesmen who have called in orders in the past hour. Their numbers are then removed from the announcement tape because they would have already been notified of their message.

An IBM Type 024 Card Punch or an IBM Type 026 Printing Card Punch Machine has been found suitable for key punch 7. The punched cards are then fed into a read transceiver 8 which converts the information of the punched cards into electrical signals and transmits the signals to signal unit 11. The signal unit 11 converts the signals into signals suitable for transmission over telephone or telegraph line 9. A second signal unit 12 receives the signals from line 9 and converts them and relays them to a punch transceiver 10 in the central office 26. The punch transceiver 10 receives the information and reproduces it upon punch cards. The punch cards are then utilized to control the order process. Suitable equipment for this operation would be IBM 065 data transceivers for transceivers 8 and 10, supplemented with 068 telephone signal unit for units 11 and 12. The IBM 65 Data Transceiver provides card-to-card transmission of punched-card data over leased communication facilities: telephone, telegraph, microwave, and short-wave. With the installation of a special feature, transmission can be accomplished over standard toll-line (including dial-up) or over high-speed telegraph service. The transceiver can be used as an ordinary key punch when it is not receiving or transmitting cards.

Checking circuits in the transceiver insure accurate data transfer and supervision at the receiving terminal controls all operations. The transceiver has a successive-card-checking feature which permits continuous transmission without operator intervention for errors.

The receiving machine 10 supervises the operation of the transmitting machine 8 and the connecting circuit units 11 and 12. Thus, the receiving machine operator must signal the transmitting machine operator that transmission may be started. Thereafter, as long as the receiving machine 10 is satisfied with each card, the transmission and reception proceed without interruption. Following the transmission of each card, the transceiver 8 sends a special signal which in effect asks the receiving machine if it is satisfied with the card it has just received. If it is, a go-ahead signal is sent back to the transceiver 8, permitting it to send the next card. If the receiving transceiver 10 is not satisfied with the card it has just received, it does not send the go-ahead signal, and the transceiver 8 stops so that the card can be repeated. With this high degree of interconnection and accuracy checking, cards can be put into the computer as fast as they are produced by the transceiver 10. Each card in itself represents a complete and checked transmission. The data transceiver 10 is a card punch. When the transceiver 8 is set to transmit, it reads a card, one column at a time, and sends its reading to the signal unit 11. There the readings are converted into impulses that can be sent along a telephone or telegraph line. When the transceiver 10 is set to receive, the signal unit 12 receives the impulses from the telephone or telegraph lines, converts these impulses to the punched card code, and sends these codes to the transceiver punch 10 which punches a card. Numbers, letters, and IBM special character codes can be transmitted.

Transmission at approximately ten or eleven cards per minute can be obtained by using the telephone signal unit 11 on microwave and short-distance radio circuits whose characteristics are at least equal to standard land line private wire telephone circuits.

Over standard private line telephone lines, the IBM 65 card unit receives approximately 16 card columns per second with an effective output of eleven fully punched 80-column cards per minute.

As shown in the figure, a second series of recorders 14, 15 and 16 are connected to a second switching device 13. The switching device 13 serves the same function as switching device 5 in that it automatically takes the incoming calls received over lines 28, 29 and 30 and places them on those recorders of recorders 14–16 which are not being utilized. The incoming telephone lines 28–30 have a different single telephone number than the lines 17–20. The recorders 14–16 operate the same as the previously mentioned recorders 1–4 and their order tapes are removed hourly and converted into punched cards by the key punch 7. The second group of recorders 14–16 may be used by an entirely different organization. For example, the recorders 1–4 may be used by the salesmen of a wholesale ice cream company who give their orders late in the day, and the recorders 14–16 may be used by a wholesale jewelry company whose salesmen give their orders early in the day. The key punch 7, read transceiver 8, and signal unit 11 are in an office which performs a service for the ice cream company and the jewelry company. As soon as orders are received on recorders 1–4, the read transceiver 8 is connected to the receiving transceiver 10. The receiving transceiver 10 is in the office 26 of the ice cream company. Orders received on recorders 14–16 are converted into cards and held. Subsequently the cards are run through the read transceiver 8. The read transceiver is connected, when it reads orders from lines 28–30, to a second telephone line 22 to a second punch transceiver 24 in central office 27 of the jewelry company.

The message switchboard 6 is in the office 26 of the ice cream company and serves incoming lines 17–20. A separate and independent message switchboard 25 in the office 27 of the jewelry company serves incoming lines 31–33. In this way a central information receiving office may level out its load by having more than one group of salesmen giving order information to it. Of course, the central receiving office may have additional switching devices and their associated banks of recorders and its read transceiver able to be connected to other punching transceivers so that the central office may serve additional firms.

Thus by my invention the late-in-the-day bottleneck caused by many salesmen calling simultaneously is avoided by utilizing recorders which are capable of receiving many orders simultaneously from one telephone number. Also any backlog produced by the simultaneous reception of the orders goes no further than the recorders and can be worked off at leisure over a long period of time without tying up the reception of further orders. This freedom is caused by the separation of the transmission to the home office from the reception of the orders at the recording station.

Further independence is established between the order reception process and the instruction process by utilizing the coded message method to inform the salesman to call another number for instructions or messages. This thereby limits any prolongation of the call beyond the time to dictate his pre-programmed order.

While I have described above the principles of my invention in connection with specific apparatus, it is to be clearly understood that this description is made only by way of example and not as a limitation to the scope of my invention as set forth in the objects thereof and in the accompanying claims. For example, the punch cards may be replaced by recording tape; as used herein the term "punch card" means both cards and tape.

I claim:

1. The method for obtaining and processing coded information from telephone callers which consists of connecting the telephone circuit from one caller of a group of similar callers having information to a telephone switching device having one incoming telephone number, switching the incoming call to one of a series of tape recorders, the switching occurring so that the incoming call is automatically switched to a non-busy recorder, announcing to the connected caller a first group of coded information by means of said recorder, recording a series of second groups of coded information stated by a plurality of said callers on the tape of the recorder, periodically playing the recorded tape so that the said series of second groups of information is reproduced consecutively, reproducing said second groups of coded information upon punch cards, utilizing said punch cards to transmit said second groups of coded information as electric signals to a receiver, and changing the recorded announcements periodically, wherein said second groups of code consist of numbers or letters directly related to the programming of the information into a computer, the sources of information deliver their information over a period of time, and the first group of information represents to the caller a function he is to perform subsequent to the call.

2. The method of claim 1 wherein the said received electric signals are utilized to punch a second group of cards in order to reproduce at a central receiving station the information on the first group of cards.

References Cited by the Examiner

UNITED STATES PATENTS

| | | | |
|---|---|---|---|
| 2,385,968 | 12/1948 | Deakin | 179—6 |
| 2,828,362 | 3/1958 | Darwin et al. | 179—2 |
| 2,835,737 | 5/1958 | Shively | 179—6 |

KATHLEEN H. CLAFFY, *Primary Examiner.*

WILLIAM C. COOPER, *Examiner.*

A. H. GESS, *Assistant Examiner.*